US012420932B2

(12) United States Patent
Kołodziejczak

(10) Patent No.: US 12,420,932 B2
(45) Date of Patent: Sep. 23, 2025

(54) SEAT RECLINE SYSTEM

(71) Applicant: B/E Aerospace, Inc., Winston-Salem, NC (US)

(72) Inventor: Marcin Szymon Kołodziejczak, Wrocław (PL)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 19/025,057

(22) Filed: Jan. 16, 2025

(65) Prior Publication Data

US 2025/0229899 A1    Jul. 17, 2025

(30) Foreign Application Priority Data

Jan. 16, 2024  (EP) ..................... 24461509
Jan. 17, 2024  (EP) ..................... 24461512

(51) Int. Cl.
*B64D 11/06*    (2006.01)

(52) U.S. Cl.
CPC ........ *B64D 11/064* (2014.12); *B64D 11/0648* (2014.12)

(58) Field of Classification Search
CPC ............... B64D 25/04; B64D 11/0689; B64D 11/0691; B64D 11/064; B64D 11/0648; B60N 2/2218
See application file for complete search history.

(56) References Cited

U.S. PATENT DOCUMENTS

| | | | |
|---|---|---|---|
| 5,125,598 A | 6/1992 | Fox | |
| 5,133,587 A | 7/1992 | Hadden, Jr. | |
| 5,507,555 A | 4/1996 | Kiguchi | |
| 7,992,934 B2 | 8/2011 | Cailleteau | |
| 9,359,080 B2 | 6/2016 | Joffre | |
| 9,421,886 B2 | 8/2016 | Cecinas et al. | |

(Continued)

FOREIGN PATENT DOCUMENTS

| | | | |
|---|---|---|---|
| CN | 108674668 A | 10/2018 | |
| CN | 113602504 A | 11/2021 | |

(Continued)

OTHER PUBLICATIONS

Astori et al., "Validation of Numerical Models of a Rotorcraft Crashworthy Seat and Subfloor," MDPI, Aerospace, vol. 7, No. 12, Dec. 10, 2020, 17 pages.

(Continued)

*Primary Examiner* — Magdalena Topolski
*Assistant Examiner* — Shanna Danielle Glover
(74) *Attorney, Agent, or Firm* — Suiter Swantz IP

(57) ABSTRACT

A seat recline system includes one or more seat legs. Each seat leg includes a recline arm including one or more detents formed on an inner side of the arm. Each leg further includes a seat pan mount having a first end attached to a seat pan and a second end located between the recline arm and the seat leg. The recline arm is free to pivot about the first mounting point relative to the seat pan mount, where the seat pan mount has a hole therethrough arranged to align with the one or more detents at predetermined pivot positions. Each seat leg includes a locking system including a locking pin and a lever arranged to move the locking pin between a locking position and a release position.

15 Claims, 5 Drawing Sheets

(56) References Cited

U.S. PATENT DOCUMENTS

| | | | |
|---|---|---|---|
| 9,604,725 B2 | 3/2017 | Cecinas et al. | |
| 2004/0152572 A1* | 8/2004 | Reitz | A63B 21/1609 482/142 |
| 2018/0099176 A1 | 4/2018 | Specht et al. | |
| 2020/0307419 A1 | 10/2020 | Finlay et al. | |
| 2023/0144561 A1 | 5/2023 | Pacheco et al. | |

FOREIGN PATENT DOCUMENTS

| | | | |
|---|---|---|---|
| CN | 116534258 A | 8/2023 | |
| DE | 2359488 A1 | 8/1974 | |
| EP | 4292874 A1 | 12/2023 | |
| FR | 2423367 A1 | 11/1979 | |
| FR | 2798628 A1 | 3/2001 | |
| GB | 2019208 A * | 10/1979 | B60N 2/12 |

OTHER PUBLICATIONS

European Patent Office, Extended European Search Report received in EP Application No. 24461509.2, May 15, 2024, 11 pages.
European Patent Office, Extended European Search Report received in EP Application No. 24461512.6, Jun. 11, 2024, 12 pages.
Monroe Engineering, "Quick Release Pins," May 15, 2015, 7 pages.

\* cited by examiner

SEAT RECLINE SYSTEM

CROSS-REFERENCE TO RELATED APPLICATIONS

The present disclosure claims the benefit of European Patent Application No. 24461512.6, filed Jan. 17, 2024, and European Patent Application No. 24461509.2, filed Jan. 16, 2024, which are both herein incorporated by reference in their entirety.

TECHNICAL FIELD

The present disclosure is concerned with a recline system for enabling the angle of a seat, e.g., in a vehicle or aircraft to be adjusted.

BACKGROUND

Seats in vehicles, e.g., road vehicles or aircraft, e.g., airplanes and helicopters, have to be designed for safety but also for comfort. Typically, seats have a seat base or pan and a seat back, and may also be provided with armrests and headrests. In some cases, the seat back and the seat pan are separate parts and the position (e.g., height, angle) of each can be adjusted independently to optimise the comfort of the user when seated. Other seats, e.g., where the seat structure needs to be particularly light, or easily installed and removed, or where cost and complexity of the seat structure should be minimised, have the seat base and the seat back formed as an integral 'seat bucket'. The seats are usually mounted to a floor via seat legs that are bolted to or otherwise (e.g., via tracks) attached to the floor. Such seats are found, for example, in helicopters. Even for bucket seats, however, the seat can be reclined if required, but this involves changing the angle of the whole seat bucket.

In many applications where such seats are installed, there is also a need for safety features to be provided to the seat. One such feature, that is important in applications where there is a crash risk, is to install an energy absorber system in the seat, such that when there is a sudden impact or force in a given direction in the environment where the seat is installed, some of that impact or force can be absorbed by the energy absorber system rather than being fully transferred to the person in the seat, thus keeping such forces that do pass to the occupant within human tolerance levels. An example of this is seats in a helicopter. Energy absorber systems are provided that absorb a sudden vertical force in the event of a crash, to avoid the full extent of the force jolting through the person in the seat, which could cause serious injury. Various types of energy absorber systems are known. These may be located in the area beneath the seat or between the seat back and the seat base. Where space is restricted, energy absorber systems have also been designed that are located in the seat legs.

In the case of bucket seats, with the energy absorber system located in the seat legs, the seat bucket typically has to be fixed in one place to ensure reliable operation of the energy absorber. There is also a desire, for improved comfort, to have more adjustable seats, where the seat back angle can be adjusted relative to the seat base/seat pan to allow the passenger to recline, but which still incorporate an effective energy absorber for the reasons mentioned above. The recline mechanism of the seat back should not adversely affect operation of the energy absorber.

There is a need for a system which enables seats to be reclined even where the energy absorber system is located in or on the seat legs.

SUMMARY

According to this disclosure, there is provided a seat recline system including one or more seat legs to which a seat including a seat pan and a seat back moveable relative to the seat pan, can be mounted, in use; and, for each of the one or more seat legs: a recline arm having a first end pivotally mounted to the seat leg and arranged to be fixedly mounted to a first mounting point of the seat back, in use, and a second end arranged to be fixedly mounted to a second mounting point of the seat back, in use, the seat arm further including one or more detents formed on an inner side of the arm intermediate the first end and the second end; a seat pan mount having a first end attached to the seat pan and a second end located between the recline arm and the seat leg, the seat pan mount fixedly attached at the second end to the leg, and where the recline arm is free to pivot about the first mounting point relative to the seat pan mount, where the seat pan mount has a hole therethrough arranged to align with the one or more detents in the recline arm at predetermined pivot positions of the recline arm relative to the seat pan mount; and a locking system including a locking pin and a lever arranged to move the locking pin relative to the hole in the seat pan mount, between a locking position in which the locking pin extends through the hole to engage in a detent of the one or more detents when a detent aligns with the hole, and a release position in which the locking pin does not extend through the hole.

Also provided is a seat including such a recline system.

BRIEF DESCRIPTION

Examples of the seat recline system according to this disclosure will now be described with reference to the drawings. It should be noted that these are examples only and variations are possible within the scope of the claims.

DETAILED DESCRIPTION

Figure 1:
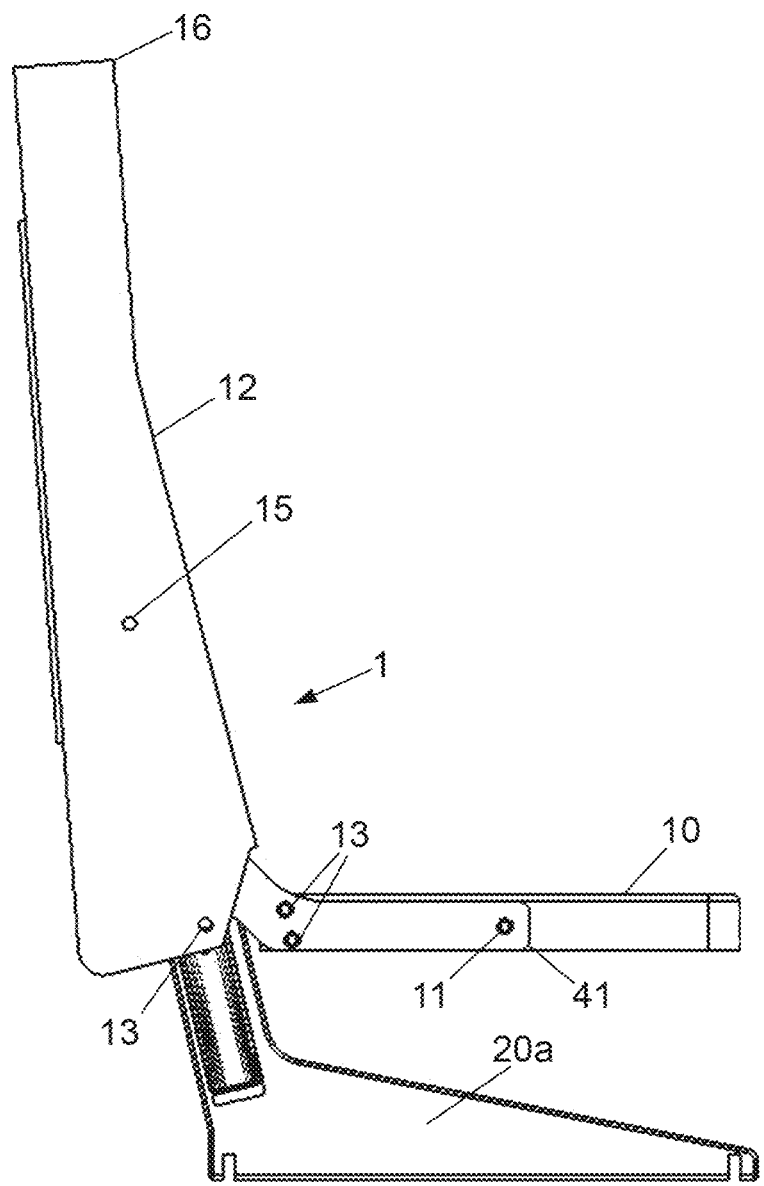
FIG. 1 is a side view of a seat to which the seat recline system of the disclosure may be provided.

FIG. 1 shows a side view of a seat 1, e.g., of a type installed in a vehicle, e.g., a helicopter. The seat includes a seat base or pan 10 on which a user sits and a seat back 12 against which the user's back can rest when seated. An integral or separate head rest 16 may be provided at the top of the seat back 12. Although not shown here, arm rests may also be provided. The seat back 12 and the seat pan 10 are two separate parts such that the angle of the seat back 12 can be adjusted relative to the seat base 10, as described further below. The seat 1 is mounted to a pair of legs 20*a*, 20*b* that mount to the floor where the seat is to be located. The legs may, in use, be fixedly mounted to the floor, e.g., by bolts or other fasteners or may be mounted into tracks or rails on the floor such that the legs can slide along the tracks or rails to different positions on the floor.

As mentioned above, typically, and particularly when an energy absorber system is provided in the legs, the position/orientation of the seat 1 relative to the legs 20a, 20b is fixed.

The design according to the present disclosure incorporates a recline system into the seat which allows the seat back to be positioned at different angles relative to the seat base and the legs. The recline mechanism, described further with reference to FIGS. 2 to 5, is mounted to the legs, between the legs and the seat which is mounted to the legs.

Figure 2:
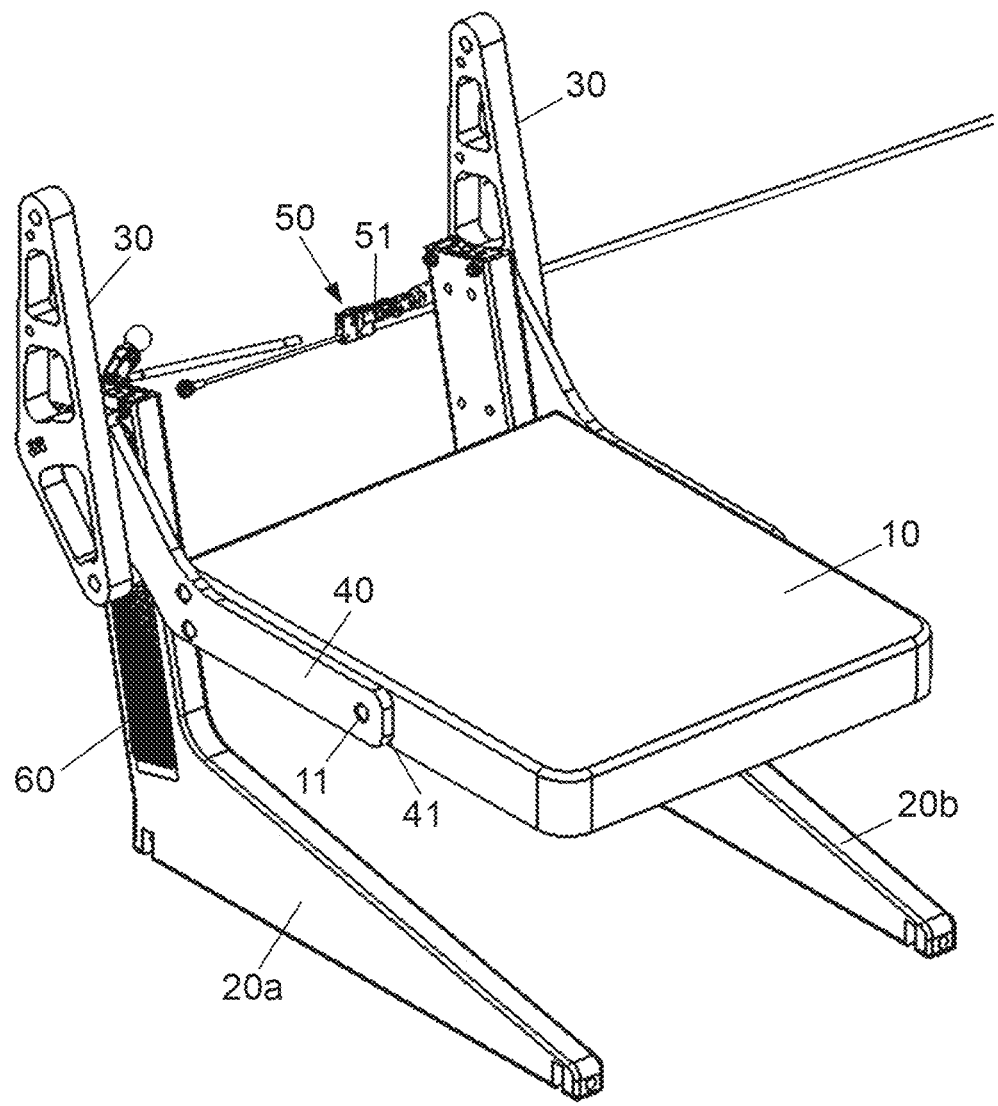
FIG. 2 shows details of a recline system, in accordance with one or more embodiments of the present disclosure.

FIG. 2 shows features of the recline system as mounted to the legs (without the seat back, for ease of explanation).

The recline system includes a recline arm 30 and a seat pan mount 40. A locking mechanism 50 may also be provided. In the example shown, having two legs 20a, 20b, a recline arm 30 and a seat pan mount 40 are mounted to each leg on the outer side 21a, 21b of the leg, where the opposite, inner sides 22a, 22b of the legs face each other. It is feasible that the recline system could also be mounted to a single leg or e.g., a pedestal, for different types of seats. The energy absorber system 60 is provided in the leg 20a, 20b.

The seat pan mount 40 is a bracket having a first end 41 attached to a side of the seat pan 10 at a first attachment point 11 and an opposite, second end 43 which is attached to the seat leg and to the energy absorber in the seat leg. In the example shown, the seat pan mount has a bend 42 intermediate the first and second ends and the seat pan mount is attached to the side of the seat pan at a second point 12 (or multiple second points) closer to the seat back than the first attachment point 11. In the example shown, therefore, a seat pan mount 40 is secured along each side of the seat pan 10 by fastenings at attachment points along the seat pan side. The seat pan mount is shown as extending part way along the length of the seat pan side but the extent of the seat pan mount along the seat pan side can be varied according to requirements (there may be a design trade-off between stability provided by a longer seat pan mount and the additional cost and weight of the longer mount). In the example shown, the second end of the seat pan mount is attached to the leg and energy absorber by two fasteners 13 but the number and type of fasteners may also be varied.

Figure 3:
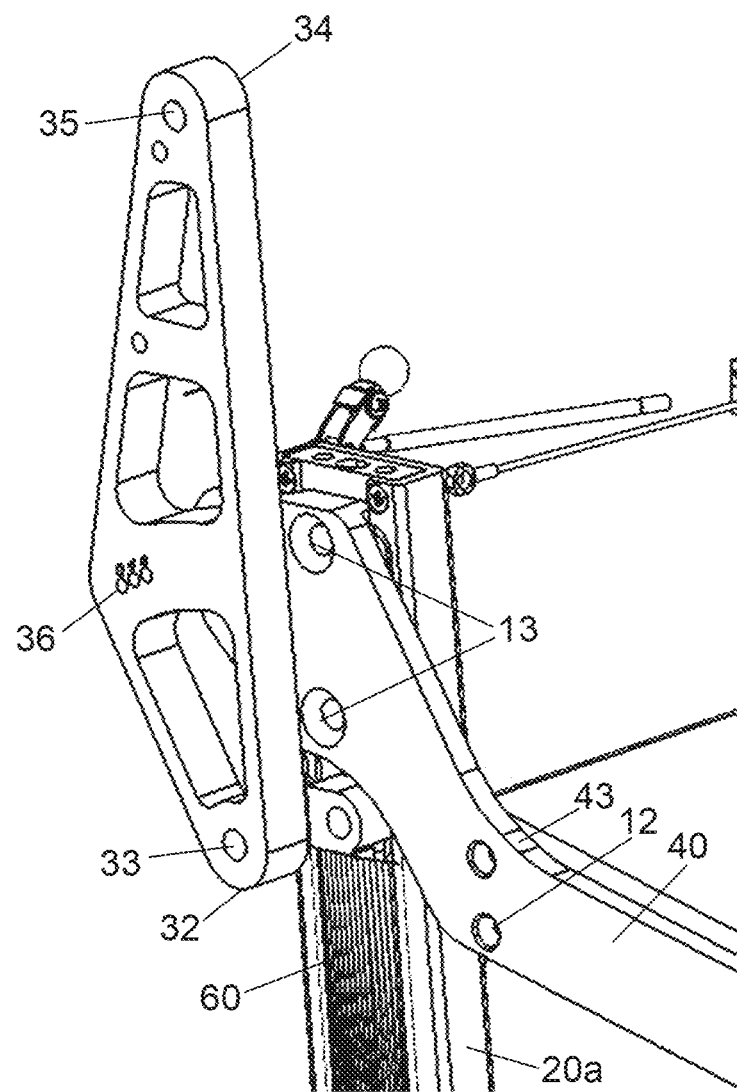
FIG. 3 shows the mechanism of the recline system in more detail, in accordance with one or more embodiments of the present disclosure.
Figure 4:
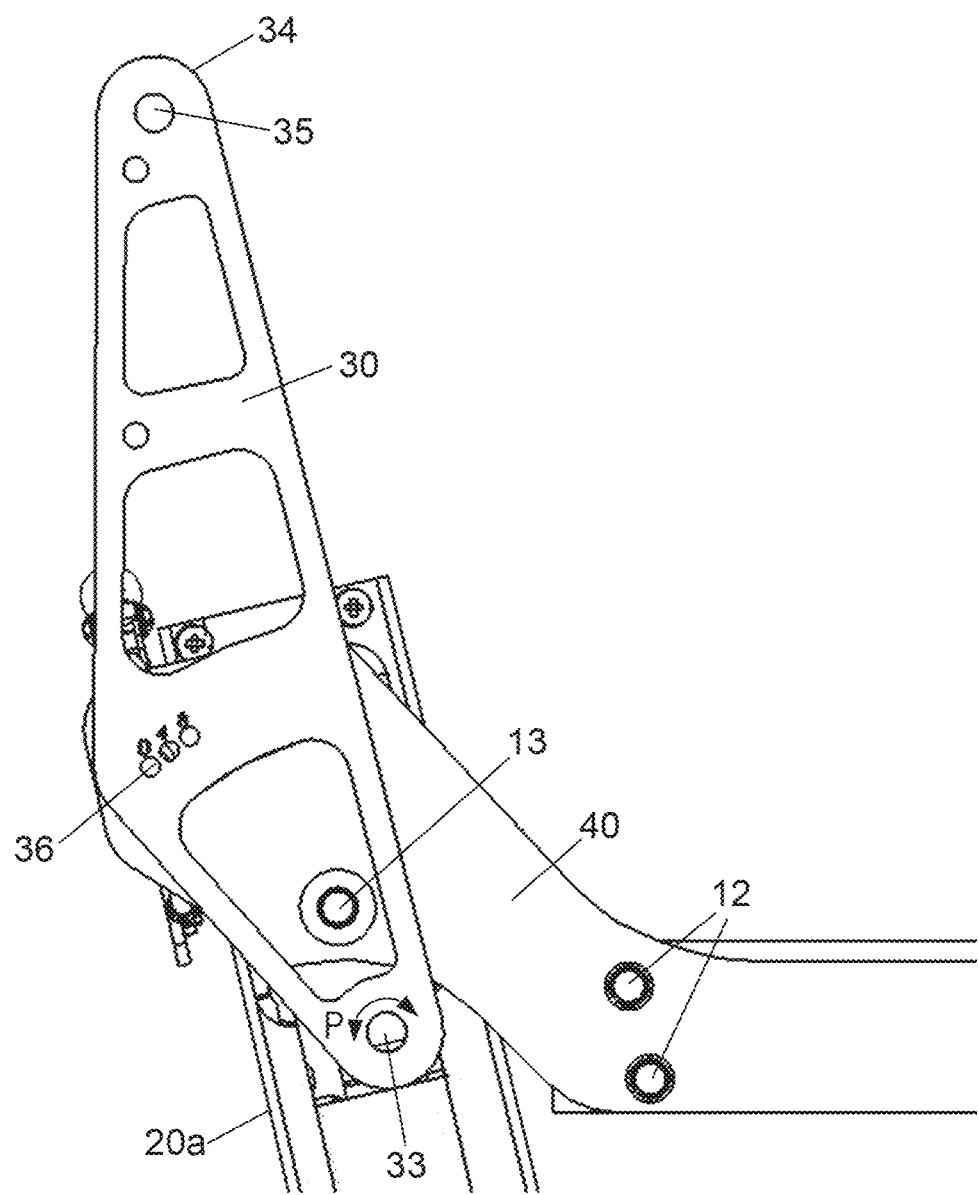
FIG. 4 shows a side view of the recline mechanism as shown in FIG. 3, in accordance with one or more embodiments of the present disclosure.

The recline system will be described in more detail with reference to FIG. 3 and FIG. 4.

As mentioned above, the recline system includes a recline arm 30 and the seat pan mount 40 and these are both arranged to be provided on the outer side 21a, 21b of the leg such that the system is between the seat back and the leg 20a, 20b when the seat is mounted to the leg(s). The seat pan mount 40 is mounted, at its second end 43, adjacent the outer side of the leg, and the recline arm 30 is mounted to an outer side 31 of the second end of the seat pan mount 40 and, therefore, between the seat pan mount 40 and the seat back when the seat is assembled to the leg(s), and the second end 43 of the seat pan mount 40 is sandwiched between the recline arm 30 and the leg.

The recline arm 30 is a relatively elongate structure having a first end 32 at which a first, or lower mounting point 33 is formed. This mounting point may be in the form of a hole through which a pin or fastener can be passed, or may be in the form of a pin or fastener formed integrally with the arm. The recline arm has a second, or upper end 34 at which a second, or upper mounting point 35 is formed. This mounting point may also be in the form of a hole through which a pin or fastener can be passed, or may be in the form of a pin or fastener formed integrally with the arm.

Located intermediate the first and the second end of the recline arm are one or more recline position detents 36 configured to engage with a recline lock of the locking mechanism 50 depending on the relative rotary position of the recline arm about the pivot point. In the example shown, the recline arm has an essentially triangular form having an apex located between the upper and lower ends, with the detents formed near the apex for engaging with the locking mechanism via the second end of the seat pan mount, as will be described further below.

The recline arm 30 is attached, at the lower mounting point 33, to a corresponding mounting point 23 formed in the leg which is a lower mounting point to which the seat back, when assembled, also connects. This connection from a lower mounting point (e.g., mounting point 13 in FIG. 1) of the seat back, through the lower mounting point 33 of the recline arm and the lower mounting point 23 of the leg defines a pivot point about which the seat back 12 and the recline arm 30 pivot relative to the leg and relative to the seat pan which is fixed, by the seat pan mount 40, relative to the leg.

The upper mounting point 35 of the recline arm 30 aligns with an upper mounting point 15 of the seat back and, when assembled, the seat back is also attached to the recline arm by connecting these two upper mounting points (e.g., by a pin or fastener). In this way, the seat back, when mounted to the legs, is attached to the recline arm 30 at the upper and lower mounting points and so is fixed relative to the recline arm but pivotal, with the recline arm, about the lower mounting point, relative to the leg. As the energy absorber system will be mounted in the leg, the seat back and the recline arm are also pivotal relative to the energy absorber (as well as relative to the seat pan).

It can be seen that the recline arm 30 is not fixed to the seat pan mount 40 by any mounting means and the recline arm, therefore, moves about the pivot point 33 relative to the seat pan mount which, in turn, is fixed to the leg and also to the seat pan. The recline arm is only secured relative to the seat pan mount by the locking mechanism when in a lock position. The seat pan mount 40 is provided with hole 44 extending through the second end 43, through which a locking pin 51 of the locking mechanism extends to engage in a respective detent in the recline arm 30 at a predetermined recline position. In the example shown, the recline arm has three detents 36 to define three different recline positions (here identified, by way of example only, as '0', '4' and '8' degrees). Depending on user requirements, there can be any number of detents at any desired spacing.

The locking mechanism 50 enables the recline arm (and therefore the seat back to which it is attached) to pivot (see arrow P in FIG. 4) about the pivot point 33, relative to the leg (and therefore, the energy absorber in the leg) and relative to the seat pan mount 40 mounted to the seat pan and to the leg, when in a release position, and to lock the recline arm (and, therefore, the seat back 12) relative to the seat pan mount 40 (and hence the leg and the energy absorber) by engagement of the locking pin 51 in a respective detent 36 in the recline arm 30.

Figure 5:
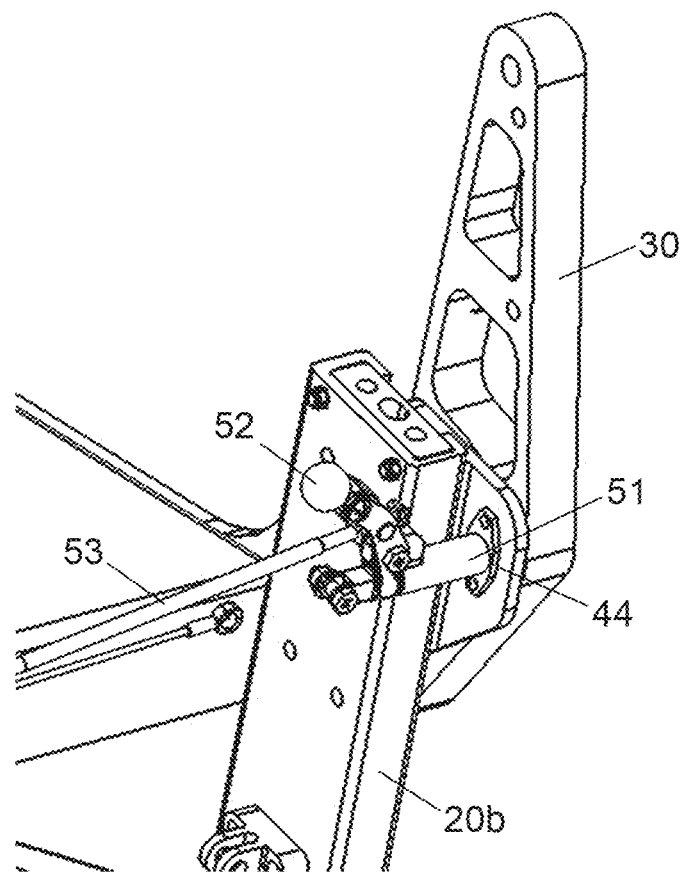
FIG. 5 shows details of a locking mechanism of the recline system, in accordance with one or more embodiments of the present disclosure.

The locking mechanism is best seen in the example shown in FIG. 5. The locking mechanism is secured to the seat pan mount 40 and includes a lever or handle 52 connected to the locking pin 51, and the locking pin 51 is aligned with the hole 44 through the seat pan mount 40. The lever 52 is configured such that movement of the lever by a user causes movement of the locking pin 51 relative to the seat pan mount and, more specifically, relative to the hole 44. In a release position of the lever 52, the locking pin 51 is retracted with respect to the hole and so does not protrude through the hole towards the recline arm, leaving the recline arm free to pivot. When the lever 52 is in a locking position, the locking pin 51 protrudes through the hole towards the recline arm and engages a detent in the arm when the detent is aligned with the locking pin. In an example, the lever is spring biased to the locking position. When the user wishes to recline the seat (or return the seat to a more upright position from a reclined position), the user moves the lever to the release position, drawing the pin away from the detent. The user can then move the recline arm (and the seat back) relative to the leg and the seat pan to a different angular position. This can be affected by the user applying force to the seat back, e.g., with the hand or by leaning on the seat back.

One or more stops may be mounted to the leg to prevent the recline arm moving too far about the pivot point in either or both directions.

The features of the recline system described may be provided on each leg, where the seat has two legs. For ease of use, the levers of the respective mechanisms may be connected, e.g., by a cable 53, such that operation of one lever by the user will cause the other lever to move via the cable. In this way, the seat recline system can be operated with one hand.

As can be seen, the recline arm is only attached to the energy absorber in the leg at the lower mounting point, which is also the recline system pivot point. The recline arm is attached directly to the seat back and is pivotal relative to the seat legs (and, therefore, to the energy absorber). In this way, the seat is attached to the recline system and also to the energy absorber, but without interfering with the energy absorber. The seat therefore retains the energy absorber safety feature whilst also being able to recline. The system enables the energy absorber to be retained in the leg, thus saving space, and the system can be used on existing seats.

The invention claimed is:

1. A seat recline system comprising:
   one or more seat legs to which a seat comprising a seat pan and a seat back moveable relative to the seat pan, can be mounted, in use; wherein each of the one or more seat legs comprises:
   a recline arm having a first end pivotally mounted to each of the one or more seat legs and arranged to be fixedly mounted to a first mounting point of the seat back, in use, and a second end arranged to be fixedly mounted to a second mounting point of the seat back, in use, the recline arm further comprising one or more detents formed on an inner side of the recline arm intermediate the first end and the second end;
   a seat pan mount having a first end attached to the seat pan and a second end located between the recline arm and each of the one or more seat legs, the seat pan mount fixedly attached at the second end to each of the one or more seat legs, and wherein the recline arm is free to pivot about the first mounting point relative to the seat pan mount, wherein the seat pan mount has a hole therethrough arranged to align with the one or more detents in the recline arm at predetermined pivot positions of the recline arm relative to the seat pan mount; and
   a locking system comprising a locking pin and a lever arranged to move the locking pin relative to the hole in the seat pan mount, between a locking position in which the locking pin extends through the hole to engage in a detent of the one or more detents when the detent aligns with the hole, and a release position in which the locking pin does not extend through the hole.

2. The system of claim 1, further comprising an energy absorber located within each of the one or more seat legs.

3. The system of claim 1, wherein the recline arm has an elongate triangular shape having an apex between the first end and the second end, wherein the one or more detents are arranged in a region of the apex.

4. The system of claim 1, wherein the seat pan mount is mounted at the second end to an outer side of each of the one or more seat legs and the recline arm is adjacent an outer side of the seat pan mount such that when the seat back is mounted to each of the one or more seat legs, the recline arm is located between the seat back and the second end of the seat pan mount and the second end of the seat pan mount is located between the recline arm and each of the one or more seat legs.

5. The system of claim 1, wherein the first mounting point and the second mounting point are defined by respective holes on the recline arm.

6. The system of claim 5, further comprising fasteners through the respective holes.

7. The system of claim 1, wherein the one or more detents comprises a plurality of detents.

8. The system of claim 7, wherein the recline arm comprises markers adjacent each of the plurality of detents indicative of a recline position or angle.

9. The system of claim 1, wherein the lever is biased to the locking position.

10. The system of claim 1, further comprising a stop to limit a pivot range of the recline arm.

11. The system of claim 1, wherein the one or more seat legs include two legs (20*a*, 20*b*) to which the seat is mounted, in use.

12. The system of claim 11, further comprising a cable connecting the lever of one leg with the lever of the other leg.

13. The system of claim 1, further comprising the seat back.

14. A seat comprising:
   a seat pan;
   a seat back moveable relative to the seat pan; and
   one or more seat legs, wherein each seat leg comprises:
   a recline arm having a first end pivotally mounted to each of the one or more seat legs and arranged to be fixedly mounted to a first mounting point of the seat back, in use, and a second end arranged to be fixedly mounted to a second mounting point of the seat back, in use, the recline arm further comprising one or more detents formed on an inner side of the recline arm intermediate the first end and the second end;
   a seat pan mount having a first end attached to the seat pan and a second end located between the recline arm and each of the one or more seat legs, the seat pan mount fixedly attached at the second end to each of the one or more seat legs, and wherein the recline arm is free to pivot about the first mounting point relative to the seat pan mount, wherein the seat pan mount has a hole therethrough arranged to align with the one or more detents in the recline arm at predetermined pivot positions of the recline arm relative to the seat pan mount; and
   a locking system comprising a locking pin and a lever arranged to move the locking pin relative to the hole in the seat pan mount, between a locking position in which the locking pin extends through the hole to engage in a detent of the one or more detents when the detent aligns with the hole, and a release position in which the locking pin does not extend through the hole.

15. The seat of claim 14, where the seat comprises an aircraft seat.

* * * * *